United States Patent
Vigars et al.

(10) Patent No.: US 9,347,424 B2
(45) Date of Patent: May 24, 2016

(54) WATER-BASED POWER GENERATION INSTALLATIONS

(71) Applicant: TIDAL GENERATION LIMITED, Stafford (GB)

(72) Inventors: Paul Vigars, Bristol (GB); Benjamin Palethorpe, Bristol (GB)

(73) Assignee: Tidal Generation Limited, Stafford (GB)

( * ) Notice: Subject to any disclaimer, the term of this patent is extended or adjusted under 35 U.S.C. 154(b) by 0 days.

(21) Appl. No.: 14/394,969

(22) PCT Filed: Apr. 11, 2013

(86) PCT No.: PCT/GB2013/050937
§ 371 (c)(1),
(2) Date: Oct. 16, 2014

(87) PCT Pub. No.: WO2013/156759
PCT Pub. Date: Oct. 24, 2013

(65) Prior Publication Data
US 2015/0123401 A1    May 7, 2015

(30) Foreign Application Priority Data
Apr. 16, 2012  (GB) .................................. 1206594.2

(51) Int. Cl.
*F03B 11/00* (2006.01)
*F03B 13/10* (2006.01)
(Continued)

(52) U.S. Cl.
CPC .................. *F03B 13/10* (2013.01); *F03B 11/00* (2013.01); *F03B 13/14* (2013.01); *F03B 13/264* (2013.01); *F03B 17/061* (2013.01); *F05B 2240/97* (2013.01); *Y02E 10/28* (2013.01)

(58) Field of Classification Search
CPC .......... F03B 11/00; F03B 13/264; F03B 13/10
USPC ............................ 290/42, 43, 53, 54; 439/271
See application file for complete search history.

(56) References Cited

U.S. PATENT DOCUMENTS

| 3,665,509 A * | 5/1972 | Elkins ............................. 439/42 |
| 2004/0137773 A1 | 7/2004 | Ostergaard |

(Continued)

FOREIGN PATENT DOCUMENTS

| CN | 200976478 Y | 11/2007 |
| GB | 2 450 624 A | 12/2008 |
| GB | 2 497 960 A | 7/2013 |

OTHER PUBLICATIONS

"Wet-mate Connector to Cut Cabling Costs," *The Engineer*, http://www.theengineer.co.uk/news/wet-mate-connector-to-cut-cabling-costs/1000423.article , Dec. 17, 2009.

(Continued)

*Primary Examiner* — Tulsidas C Patel
*Assistant Examiner* — Sean Gugger
(74) *Attorney, Agent, or Firm* — Dority & Manning, P.A.

(57) ABSTRACT

A water-based power generating installation includes a water based power generating device operable to derive power from a body of water, and to export that power via a power export cable, and an infrastructure arrangement for providing a power export connection from the installation, and including infrastructure equipment for the installation, which infrastructure equipment serves to connect the power generating device with the power export connection.

23 Claims, 12 Drawing Sheets

(51) Int. Cl.
  *F03B 13/26* (2006.01)
  *F03B 17/06* (2006.01)
  *F03B 13/14* (2006.01)

(56) References Cited

U.S. PATENT DOCUMENTS

| | | | |
|---|---|---|---|
| 2009/0045631 A1* | 2/2009 | Gibberd et al. | 290/53 |
| 2010/0084925 A1* | 4/2010 | Draper et al. | 307/84 |
| 2010/0314871 A1* | 12/2010 | Jean et al. | 290/42 |
| 2011/0012364 A1* | 1/2011 | Abolhassani et al. | 290/55 |
| 2011/0021049 A1* | 1/2011 | Ramasubramanian et al. | 439/201 |
| 2012/0202369 A1* | 8/2012 | Blaxland | 439/271 |

OTHER PUBLICATIONS

Written Opinion issued in International Application No. PCT/GB2013/050937 dated Oct. 9, 2013.

International Search Report issued in International Application No. PCT/GB2013/050937 dated Oct. 9, 2013.

Examination Report issued in British Application No. GB1206594.2 dated Feb. 19, 2014.

Search Report issued in British Application No. GB1206594.2 dated Jul. 24, 2012.

* cited by examiner

WATER-BASED POWER GENERATION INSTALLATIONS

The present invention relates to water-based power generation installations.

BACKGROUND OF THE INVENTION

It is widely known that easily accessible resources of fossil fuels are declining. In addition, the impact of the use of fossil fuels upon the environment has become increasingly apparent. As a result of this, it has become imperative that viable alternative energy sources are used as effectively and efficiently as possible. For example, the use of turbines to capture the power of water flow, such as tidal, river and ocean current flows is becoming a viable source of alternative energy. The turbine equipment used to capture such water flow energy typically includes a shaft driven generator connected using a drivetrain to a rotor assembly. The rotor assembly includes a plurality of rotor blades that are driven by the water flow, so as to turn an input shaft of the drivetrain. Alternative water-based power generation devices such as wave driven devices are also being considered.

In order to be economically practical, multiple power generating devices should be deployed in a suitable area. For example, a tidal turbine farm may have tens to hundreds of turbines. The turbines are preferably arranged in an array having multiple rows of multiple turbines. The turbine array could be deployed in a tidal flow area, a river flow, an ocean current, or any other suitable water current area. Although it is preferable for the turbines to be arranged in an array, geography, bathymetry and other factors may mean that a turbine farm has another arrangement.

In order that such an array of power generating devices are able to export the generated power from the array, and to receive control signals, it is necessary to provide an amount of infrastructure equipment for the array. In a simple arrangement, each power generating device can be connected directly to infrastructure located on the shore. However, such a solution results in many cables being laid, often over large distances. Offshore wind farms make use of switching, transformer and control equipment located in dry spaces above the surface of the water. For such offshore wind farms, providing the infrastructure equipment above the surface does not present any additional problems or issues, since the wind turbines themselves are, naturally, above the water.

However, water current turbines are located underwater, and are often located in water too deep to make surface breaking structures practical. In addition, since the remainder of the array would be under the water surface, it is unlikely that permission would be given for the provision of a surface breaking infrastructure unit. Even where floating wave devices are deployed, it is desirable to minimise the amount of surface breaking equipment.

Installation, maintenance and servicing of such underwater infrastructure equipment, such as switches, frequency converters, isolators, circuit breakers signal boosters, transformers, and measurement and control equipment, particularly in deep sea environments, are highly costly and time consuming procedures. Infrastructure equipment typically requires through-life inspection, maintenance and servicing. It is therefore desirable to simplify the construction and deployment of underwater infrastructure equipment, lowering capital cost and enabling inspection, servicing and maintenance of the infrastructure equipment in a relatively cost effective and efficient manner.

SUMMARY OF THE INVENTION

According to one aspect of the present invention, there is provided an infrastructure arrangement for a water-based power generating installation including a power generating device operable to derive power from a body of water, and to export that power via an export cable, the infrastructure arrangement comprising a base for location on a bed of the body of water, the base having an installation export connection connected for export of power from the installation, a power input connection for receiving power from a power generating device, and an engagement system for receiving an infrastructure module, and an infrastructure module releasably engaged with the engagement system of the base, and including connection apparatus for connecting the power input connection of the base with the installation export connection of the base, wherein the power input connection of the base includes a connector portion for connection with a corresponding connector portion of an export cable of a power generating device.

In one example, the power input connector of the base defines a connector shape onto which a connector module of an export cable of a power generating device can be lowered for connection of the export cable to the power input connection.

In one example, the connection portions are wet-mate connectors.

One example further comprises clamping apparatus for holding the infrastructure module in place on the engagement system.

In one example, the infrastructure module and base are provided with at least one cooperating wet-mate connector pair.

In one example, the infrastructure module is buoyant. In such an example, the infrastructure module may be adapted to be deployed on the base using a winch arrangement.

In one example, the installation export connection is adapted for connection with an installation export cable using a spliced, dry-mate or wet-mate connector.

In one example, the base is a gravity base unit. In another example, the base is secured to the bed of the body of water.

In one example, the infrastructure module includes one or more switch, frequency converter, isolator, circuit breaker, signal booster, transformer, and/or measurement and control equipment.

In one example, the base further includes one or more switch, frequency converter, isolator, circuit breaker, signal booster, transformer, and/or measurement and control equipment.

In one example, the export cable of the power generating device includes a subsea umbilical termination unit for connecting a power export cable from the power generating device to a jumper cable, the jumper cable being for connection to the power input connector of the base.

In one example, the base comprises a plurality of such power input connections for receiving power from respective power generating devices, and wherein the infrastructure module includes equipment operable to connect such a plurality of input connections to the installation export connection.

In one example, the installation export cable and/or power export cable comprises power and auxiliary connections. The power and auxiliary connections may be provided in separate respective cables, or may be provided in a single cable. Such auxiliary connections may provide measurement, control and/or communications connections.

According to another aspect of the present invention, there is provided a water-based power generating installation comprising a water based power generating device operable to derive power from a body of water, and to export that power via a power export cable, and an infrastructure arrangement for providing a power export connection from the installation, and including infrastructure equipment for the installation, which infrastructure equipment serves to connect the power generating device with the power export connection, wherein the infrastructure arrangement is provided by an arrangement according to the first aspect of the present invention.

In one example installation, the power generating device is a water stream turbine device.

In one example installation, the power generating device is a tidal stream turbine device.

In one example installation, wherein the power generating device is a wave powered device.

DETAILED DESCRIPTION OF THE PREFERRED EMBODIMENTS

Figure 1:
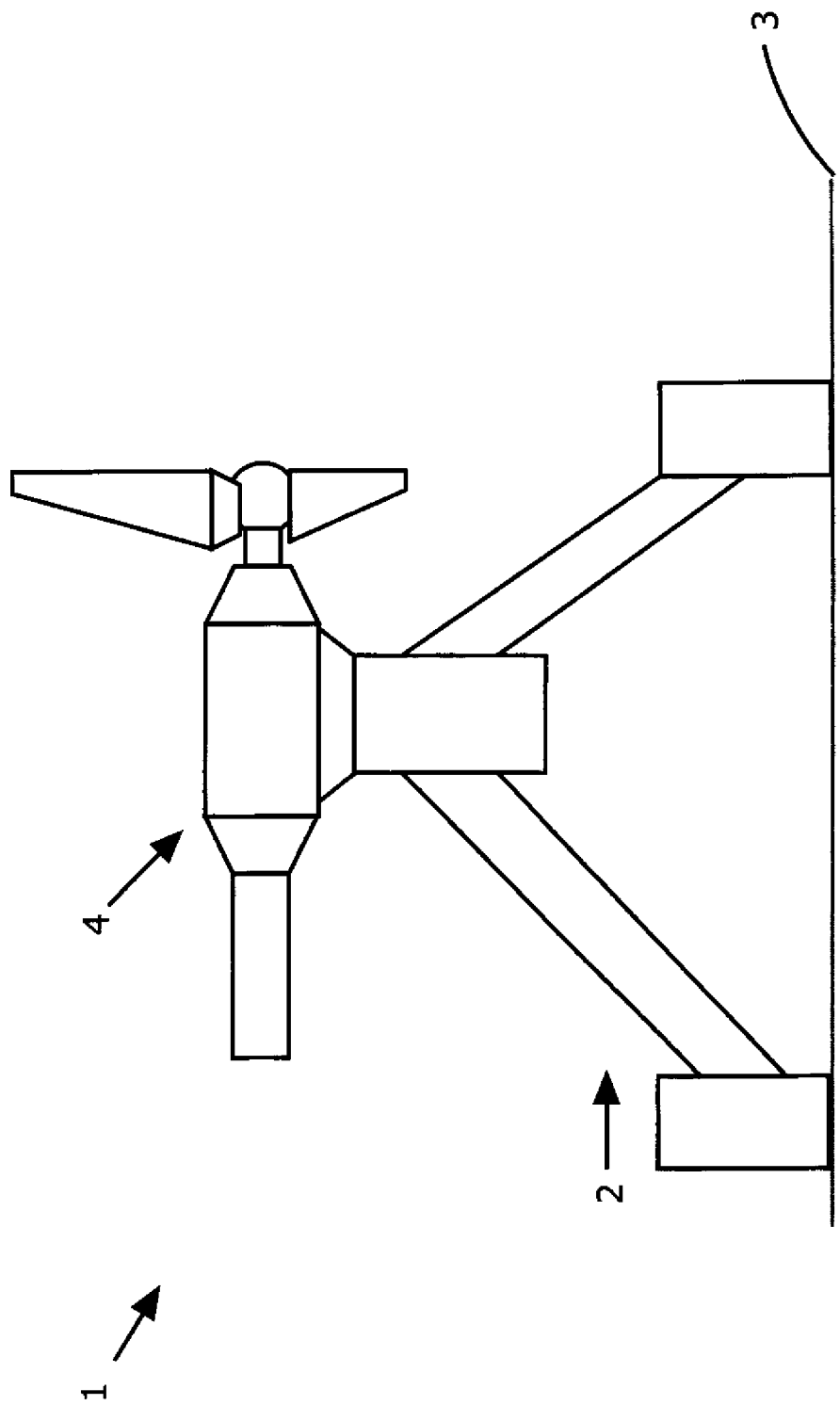
FIG. 1 is a schematic view of an example water current power generation system.

An example water current power generation system 1 is shown in FIG. 1 and comprises a support structure 2 located on a bed 3 of a body of water. A power generation unit 4, such as a turbine device, is mounted on the support structure 2. In this example, as the water current flows past the power generation unit 4, a rotor assembly turns, thereby driving an electrical generator, or other power converter apparatus, provided in the power generation unit 4. In one example, the power generation unit 4 is buoyant, and is winched down to the support structure 2. Although a water current turbine is illustrated in FIG. 1, it will be readily appreciated that the principles and embodiments of the present invention are applicable to use with any type of water-based power generation system, such as wave power devices.

Figure 2:
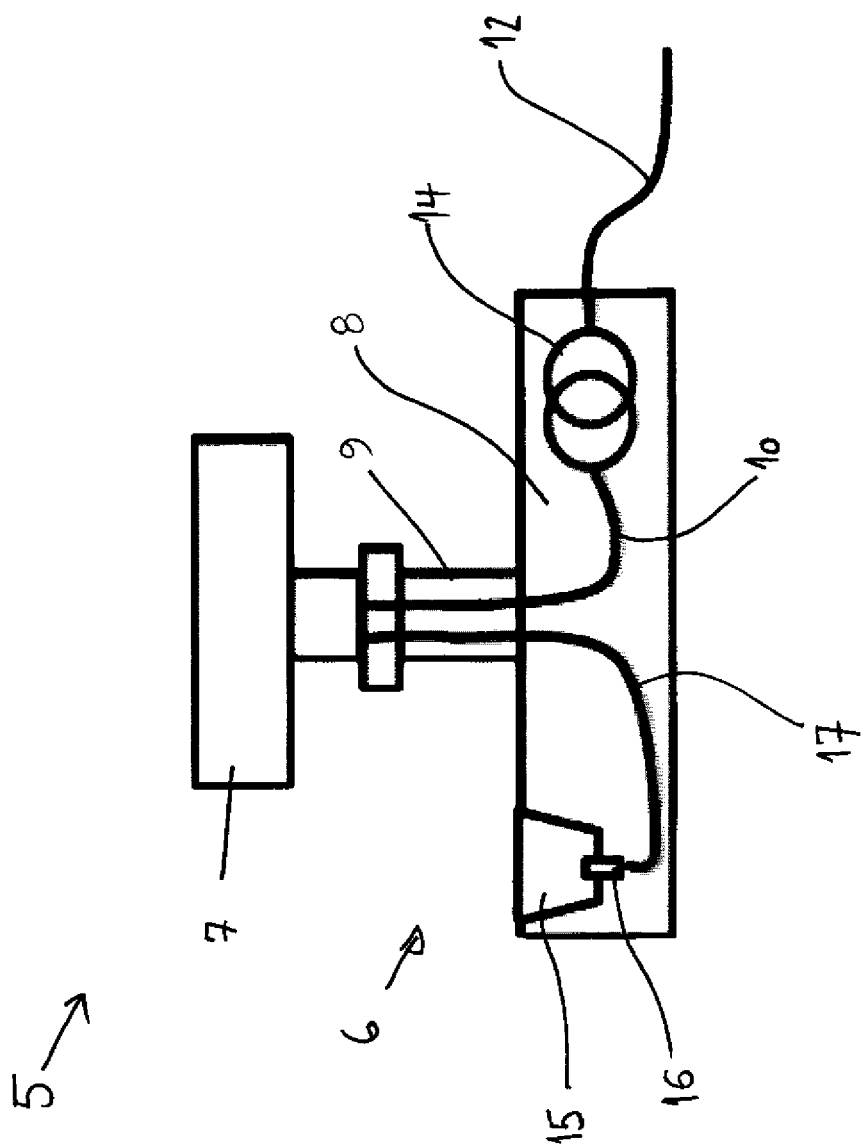
FIGS. 2 and 3 are a schematic side and plan views of an infrastructure arrangement for use with the power generation system of FIG. 1.
Figure 3:
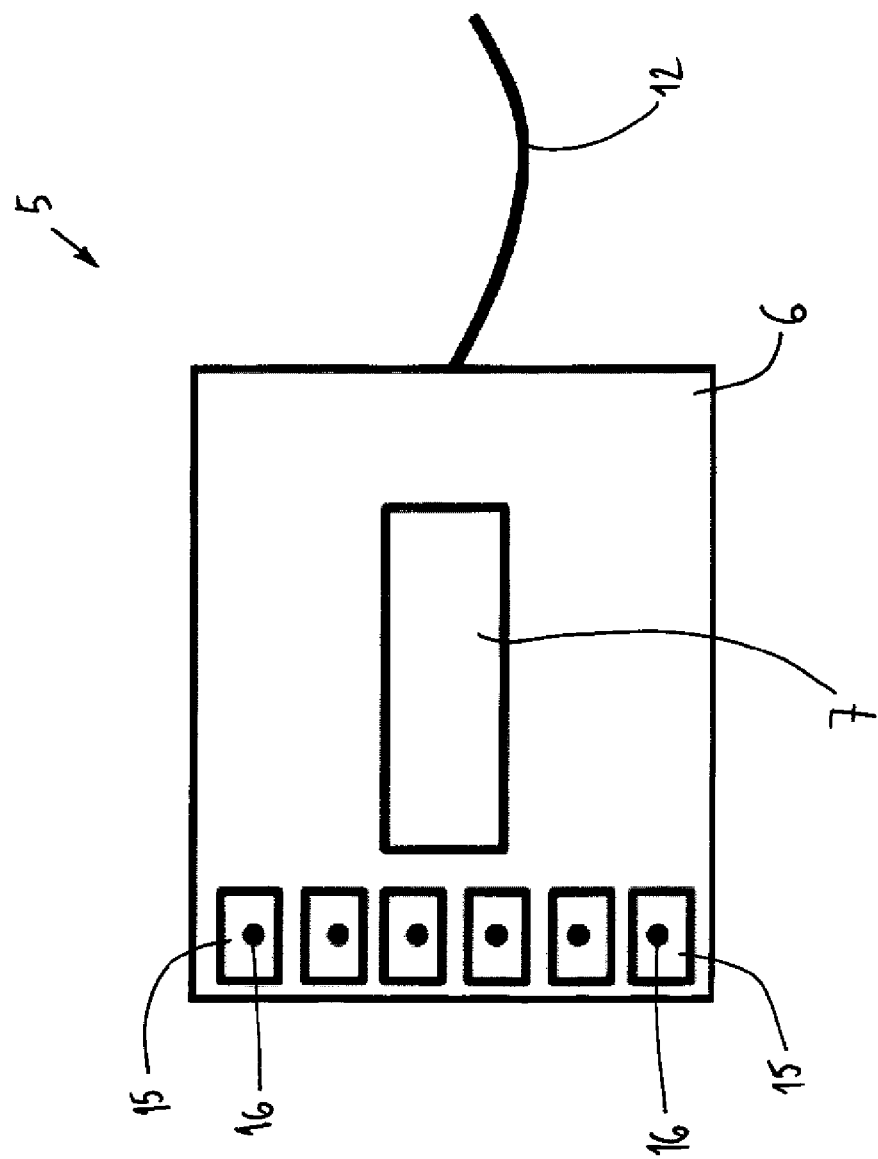

FIGS. 2 and 3 illustrate schematic side and plan views of an infrastructure arrangement 5 suitable for use with the power generation system 1 of FIG. 1, or with any suitable water based power generating device or devices. The infrastructure arrangement 5 comprises a support 6, and an infrastructure module 7 adapted for releasable mounting on the support 6. The infrastructure module 7 houses any appropriate equipment such as switches, frequency converters, isolators, circuit breakers, signal boosters, transformers, and measurement and control equipment. In one example, the infrastructure module 7 is buoyant, and is winched down to the support 6. In another example, the infrastructure module 7 is lowered to the support 6 using a crane or similar equipment.

In the example shown, the support 6 comprises a base 8 from which extends an engagement structure 9. The engagement structure may be provided by any suitable arrangement, such as the projecting structure shown in FIG. 2, or a recessed engagement structure into which the infrastructure module extends. Other configurations are also possible, including a flush mounted arrangement.

In the example shown in FIG. 2, the base 8 is a so-called "gravity base" which uses its weight to hold it in position on the bed of the body of water in which the base is deployed. The base 8 may be provided by a single structure, or may be modular in form, such as a frame structure provided with appropriate weights. As an alternative, the base 8 may be secured to the bed of the body of water, for example using a pile driven in to the bed or a pile grouted into a drilled hole in the bed.

The engagement structure 9 allows the infrastructure module 7 to be held in place on the support 6, and to be removed from the support 6. The engagement structure 9 may be provided with guide elements to enable the correct orientation and alignment (both polar and axial) of the infrastructure module 7 with respect to the engagement structure 9. The module 7 and engagement structure 9 may be required to be aligned before engagement, may be aligned during engagement, or may be provided with connectors that do not require specific alignment. In one particular example, the module 7 may not require specific polar orientation to be engaged with the engagement system.

The infrastructure module 7 and/or engagement structure 9 may be provided with a clamping system 10 that is able to securely engage with the infrastructure module 7. The clamping system 10 is shown schematically in FIG. 2, and may be provided by any suitable clamp arrangement.

The support 6 provides the infrastructure module 7 with connections to other parts of the installation, such as the power generating devices and power export infrastructure. The support 6 is provided with a power export connection 10 which connects equipment within the infrastructure module 7 to a power export cable 12. The equipment in the infrastructure module 7 is connected to the connection 10 via releasable connectors, such as "wet-mate" connectors, in the engagement structure 9. Wet-mate connectors are connection devices which are able to be connected and disconnected underwater, and typically comprise two connector halves that are brought together. The engagement structure 9 provides power, monitoring, communications and control connections between the support 6 and the infrastructure module 7, and may include conductive and fibre optic connections.

The support 6, and engagement structure 9 in particular, enable the infrastructure module 7 to be recovered to the water surface in a relatively straightforward manner, when maintenance or replacement is needed. Deployment and retrieval of the infrastructure module 7 is described in more detail below.

The power export connection 10 may be connected directly with the power export cable 12, or may be connected via a transformer 14, as shown in FIG. 2. The use of the transformer 14 is optional, and its use is dependent on the electrical output requirements of the installation. For example, electrical power may be generated at 11 kV by the power generation devices in the installation, but the export power may be required at 33 kV. Accordingly, one or more transformers can be provided, in the infrastructure module 7 and/or in the base 8. The power export cable may also include monitoring, communications and control connections.

The power export cable 12 may be connected with the power export connection 10 or transformer 14 using any suitable type of connection technology. For example, the power export cable may be connected using splicing, a dry-mate connector or a wet-mate connector. The base 6 may be provided with a cable "tail" to which the export cable 12 is connected, or the cable 12 may be connected with a connector in the base. Another alternative would be for the export cable 12 to connect with the base/infrastructure module using a subsea umbilical termination unit (SUTU). Multiple power export cables 12 may be provided where required.

The support 6 also provides the infrastructure module 7 with a connection to at least one power generating device. An input connector 15, for example including a wet-mate connector 16, is provided for each generating device to be connected to the infrastructure module 7, and is connected to the infrastructure module 7 via a device connection 17 and the engagement structure 9.

In the example shown in FIGS. 2 and 3, the support 6 is provided with a plurality of input connectors 15 for connection with respective power generating devices. Each input connector includes a connector portion, for example a wet-mate connector portion 16, to which a corresponding connector portion is connectable, as will be described below. In the example shown, the input connector 15 is defined by at least one sloping wall which serves to guide a device connector into connection with the connector portion 16. In the example shown in FIGS. 2 and 3, the input connector 15 is defined by a tapered hole, of any suitable cross-section.

Figure 4:
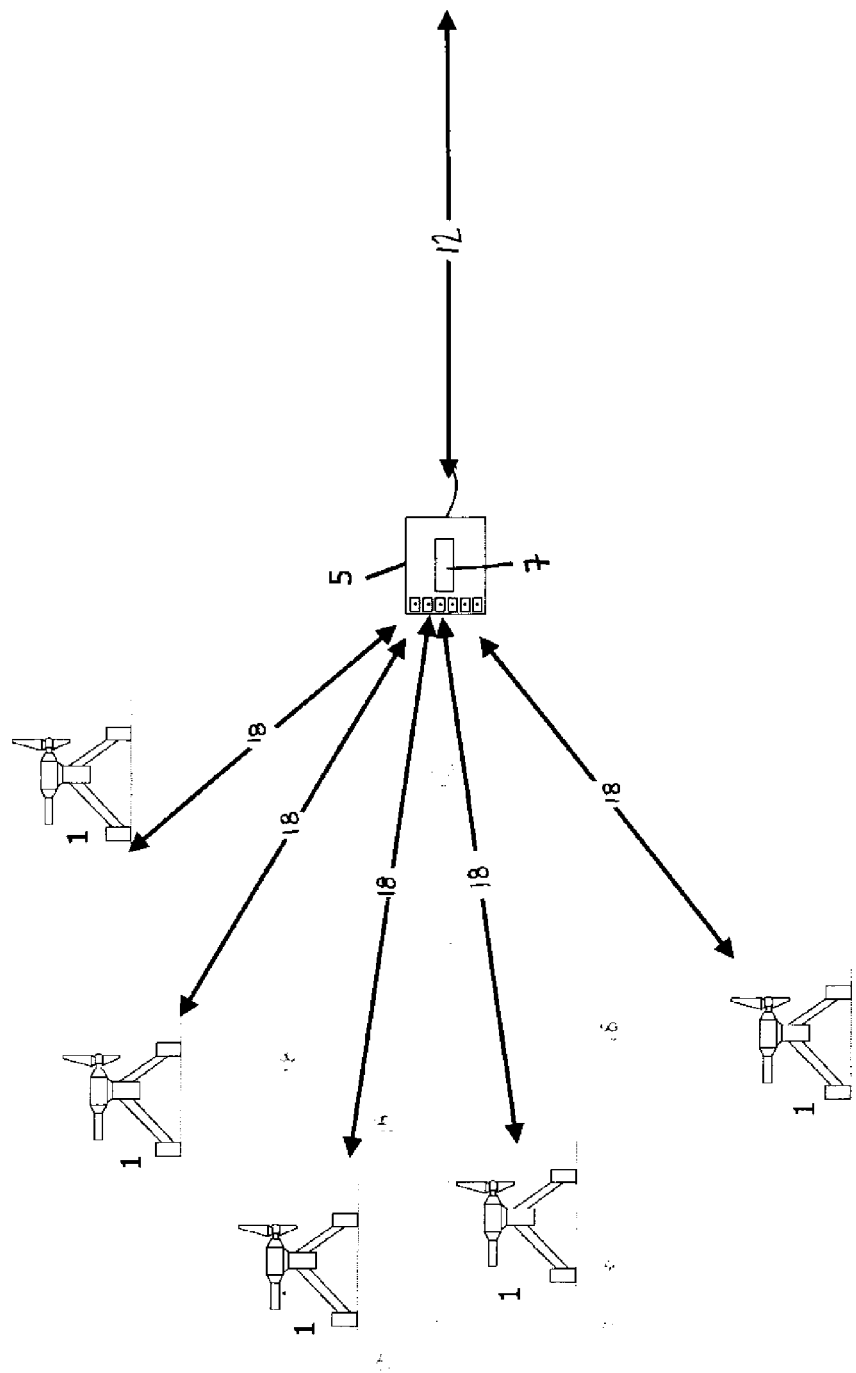
FIG. 4 illustrates an underwater water current power generation installation.

FIG. 4 illustrates an array of power generating devices, in this example, turbines 1, connected to a common infrastructure arrangement 5, via illustrative connections 18. The infrastructure arrangement provides common power, measurement and control equipment for all of the turbines 1, and it will be appreciated that any number of power generating devices may be provided in the array. Similarly, it will be appreciated that any number of infrastructure arrangements 5 may be provided, and that such arrangements may be interconnected as appropriate.

The infrastructure module 7 contains switching, control and other equipment that enables the outputs from the generating devices 1 to be aggregated and supplied as a single output via the power export cable 12. The power export cable 12 can be of any appropriate configuration. For example, the cable 12 may include multi-phase conductors, control and monitoring connection including fibre optic cables.

Figure 5:
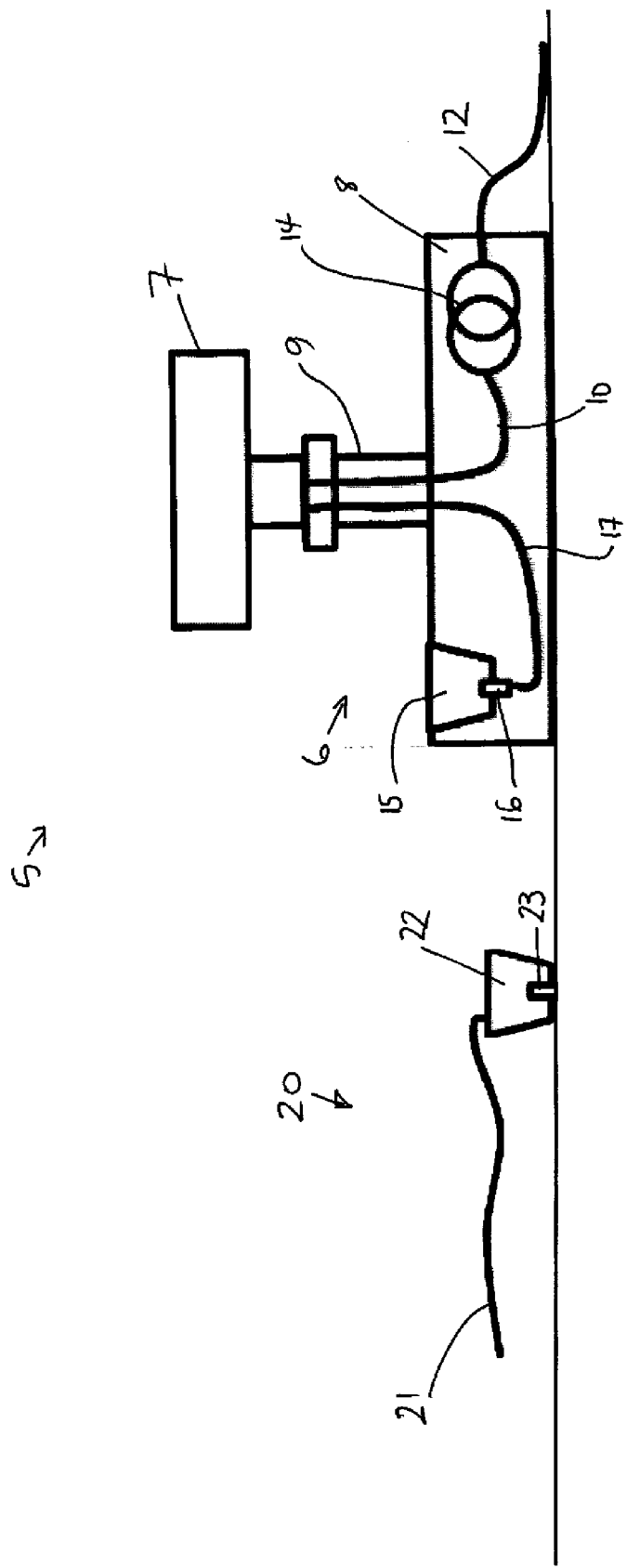
FIGS. 5 to 8 illustrate connection details of the arrangement of FIGS. 2 and 3.

FIG. 5 is a schematic side view of the infrastructure arrangement 5 in place on a bed of a body of water. A device connector 20 is shown adjacent and unconnected to the arrangement 5. The device connector 20 includes a device cable 21 which is connected at one end to a power generating device (not shown for clarity). The other end of the device cable 21 terminates in a connection module 22 which includes a connector portion 23. The connector portion 23 is for connection and engagement with a corresponding connector portion 16 located on the base 8, such that the device cable 21 is connected with the infrastructure module 7, and hence the power export cable 12. The connector portion 23 is of a type that is compatible with the input connector portion 15. For example, the two connector portions 16 and 23 may be respective parts of a wet-mate connector. The connector portions 16 and 23 may be provided by a single connector device, or by any appropriate number of devices, dependent on the number of connections that need to be made to the base 6. For example, auxiliary (power, control and measurement) connections can be provided by a single cable and connector device, or by respective separate cables and a single connector device, or by respective separate cables with corresponding separate connector devices. Any connector devices may be provided on a single connection module 22.

The auxiliary connections may be provided in a cable or cables separate to the power export cable, or may be integrated in to the same single cable. Different auxiliary connections may be provided with different respective cable/connector combinations.

The connection module 22 and connector portion 23 are designed so as to be engageable with the input connector 15 and connector portion 16 respectively, using only a simple lifting and lowering operation. Such an operation will be described with reference to FIGS. 6 to 8.

Figure 6:
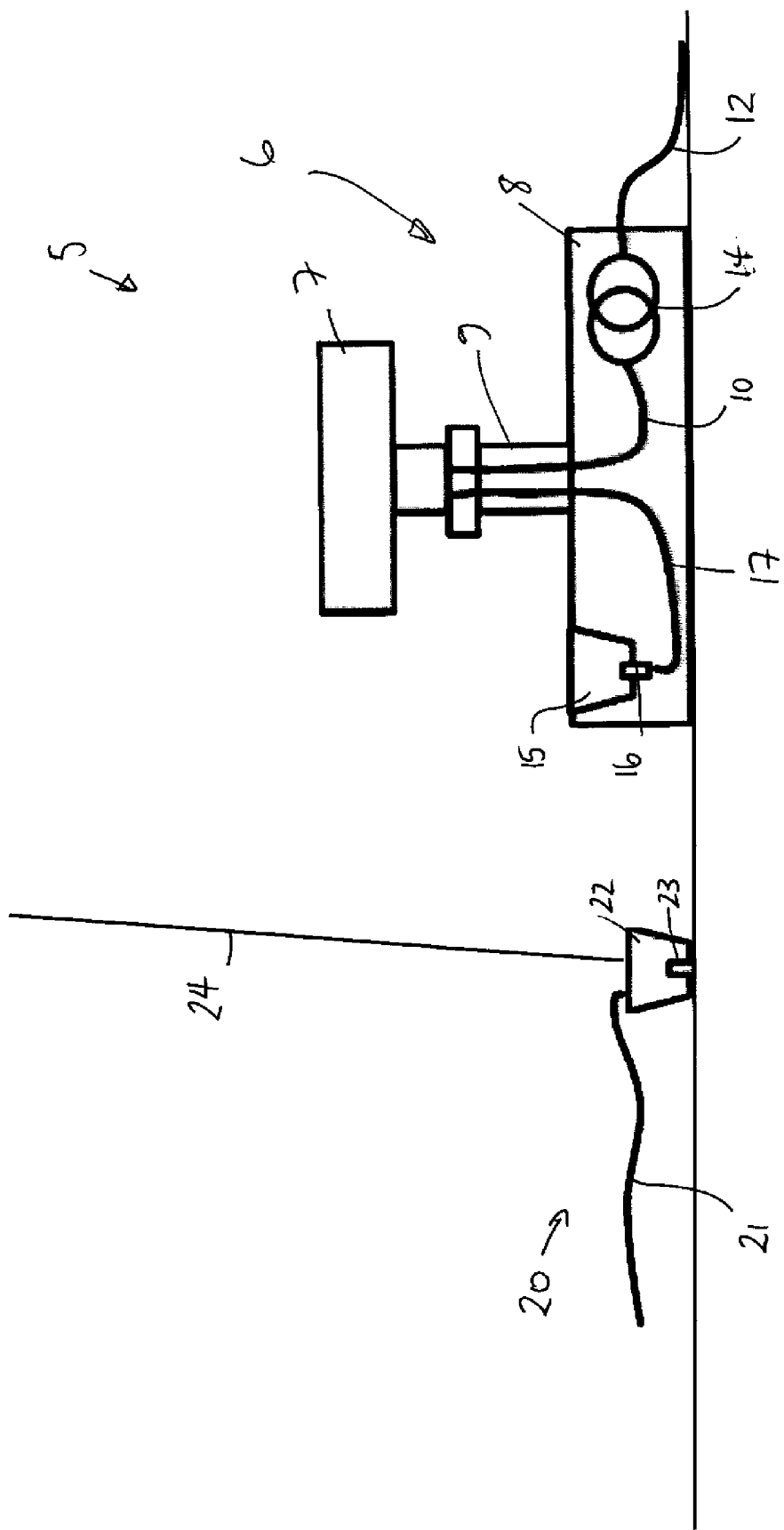

In FIG. 6, the device connector 20 is shown deployed adjacent the infrastructure arrangement 5 on the bed. A lifting cable 24 is attached to the connection module 22. The lifting cable 24 may be attached using a diver or a remotely operated vehicle (ROV). The lifting cable 24 is deployed from a crane or similar lifting equipment located on a deployment vessel on the surface of the body of water. The deployment vessel is not shown in FIG. 6 for the sake of clarity.

Figure 7:
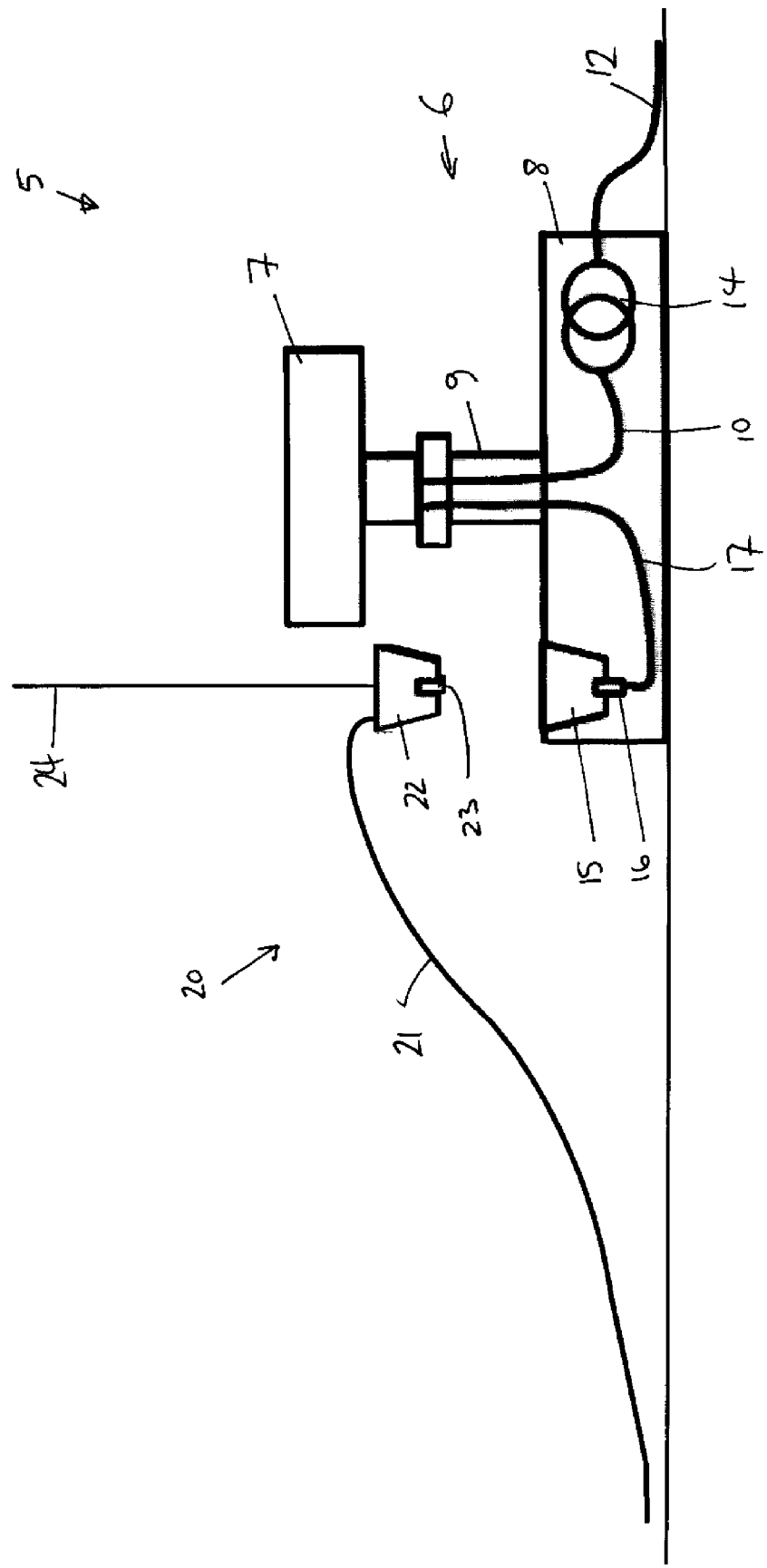

As illustrated in FIG. 7, the lifting cable 24 is retracted on the deployment vessel so as to lift the connection module 22 clear of the bed. The lifting cable 24 is then manoeuvred such that the connection module 22 is substantially directly over the input connector 15 on the base 8.

The lifting cable 24 is then paid out from the deployment vessel, so as to lower the connection module 22 into the input connector 15. The input connector 15 and connection module 22 have cooperating shapes, such that the connection module 22 is guided into position by way of its interaction with the input connector 15. In the example shown, the input connector 15 is defined by a tapered hole in the base 8, and the connection module 22 is provided with a complementary outer surface. In this manner, the connector portions 16 and 23 on the base and connection module respectively are brought into engagement with one another. The lifting cable is then released from the connection module 22 either by a diver or using an ROV, and retrieved to the deployment vessel, or used to connect another of the power generating devices to the infrastructure arrangement. The connector portions 16 and 23 may be rigidly located within the input connector 15 and connection module 22 respectively. Either or both connectors may alternatively be compliantly mounted, in order that any misalignment between the connector portions can be taken up.

Figure 8:
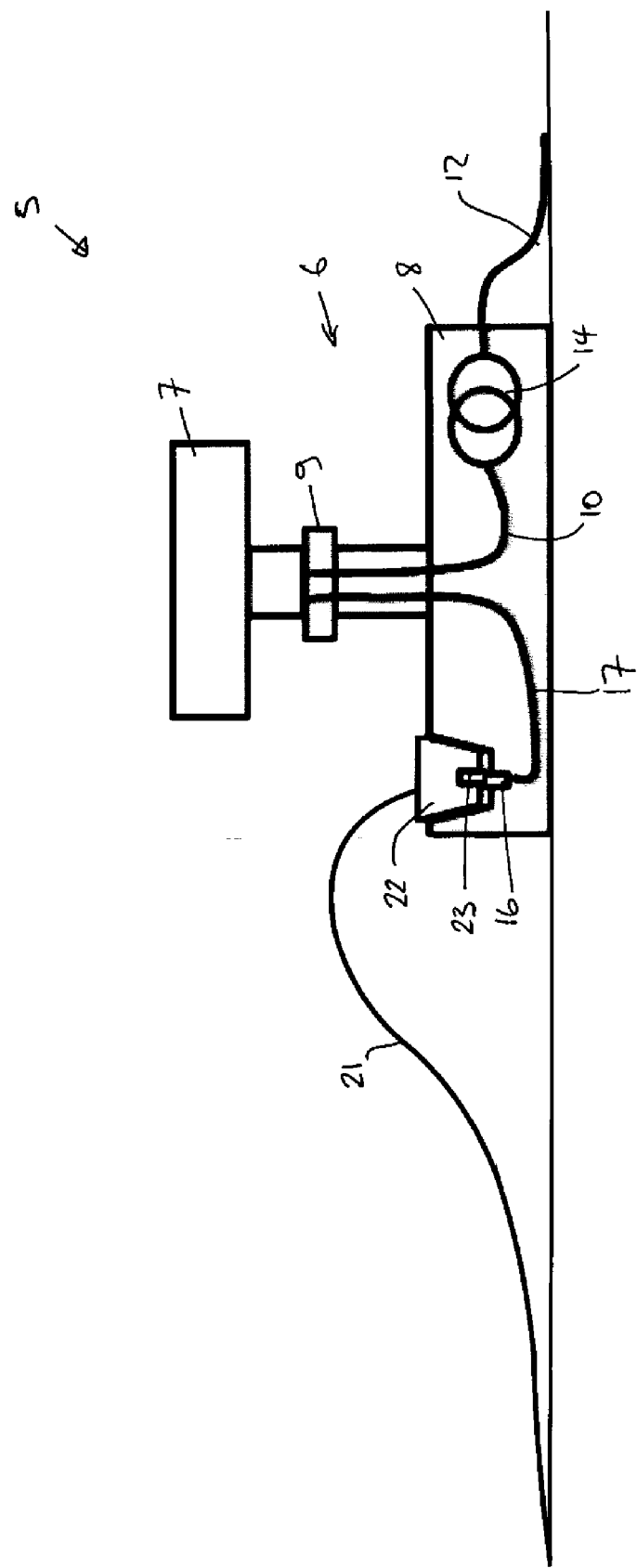

FIG. 8 illustrates the connection module 22 in connection with the input connector 15, with the connector portions 16 and 23 engaged with one another. The weight of the connection module 22 serves to keep the connector portions 23 in engagement with the connector portion 16. Each power generating device has a device connector 20 for connection to a corresponding input connector 15 on the base 8, and each device connector can be engaged using the technique described above. Since the connection process is straight forward and requires a single lift and lower operation, connection of multiple devices to the infrastructure is greatly simplified and reduced in time.

Disconnection of the power generating device from the infrastructure arrangement 5 is simply the reverse of the connection process; the lifting cable 24 is attached to the connection module 22, and the connection module lifted out of engagement with the input connector 15. The connection module can then be placed adjacent the base 8 ready for reconnection. A specific location or "parking socket" may be provided for locating the unconnected connection module, in order to protect the module.

The device connection shown in FIGS. 6 to 8 is a direct connection between the infrastructure arrangement 5 and the power generating device. However, the principles of the present invention may be applied to alternative configurations, such as that shown in FIG. 9, for example.

Figure 9:
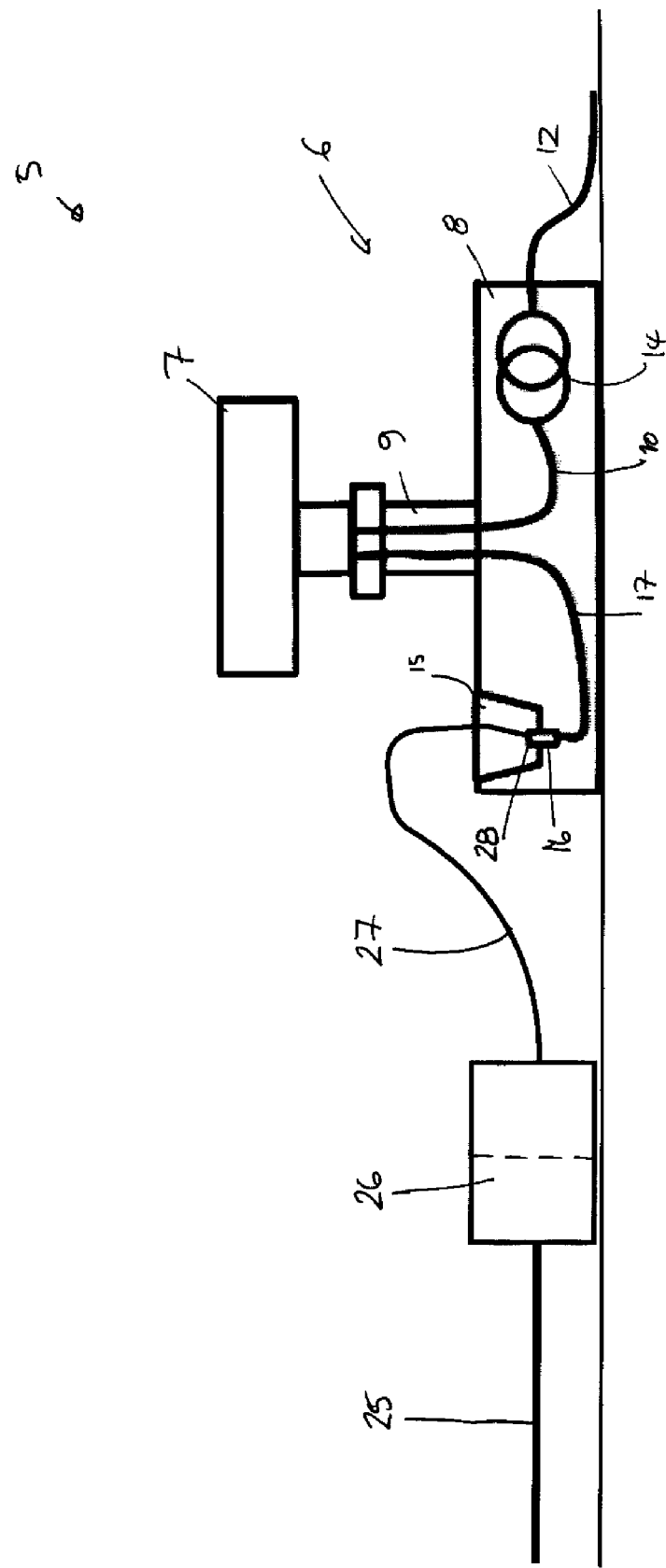
FIG. 9 illustrates an alternative connection configuration for an infrastructure arrangement.

An export cable from a power generating device is often heavily armoured, and hence not particularly flexible. This lack of flexibility can present problems with the lift and lower operation to connect the device to the infrastructure arrangement. In order to address these possible drawbacks, an alternative cable configuration is shown in FIG. 9. An export cable 25 from the power generating device is connected with a connection unit 26. A relatively flexible cable 27 is provided with a connector portion 28 for connection to the connection portion 16 of the base 8. This relatively flexible cable 27 can be kept desirably short, so as to reduce the amount of cable located on the bed. The length of the flexible cable 27 is primarily determined by how close it is possible to position the export cable 25 to the base 6. The connection unit may be any appropriate connection technology, such as spliced, wet-mate or dry-mate. One example of a connection technology is the so-called SUTU or subsea umbilical termination unit, which can make use of any suitable combination of splicing, wet-mate and dry-mate connectors. The connections to the SUTU can be provided by single or double ended connecting cables. In the single ended case, one end of the connecting cable is provided with a wet-mate connector portion, and the other end spliced or dry-mate connected. In the double ended case, both ends of the connecting cables are provided with wet-mate connectors. It will be appreciated that any number of connecting cables may be provided for connection using a SUTU, and that any suitable combination of single and double ended connecting cables may be used.

The main reason for using a SUTU and jumper cable is that the heavy and inflexible cable armouring of the main power export cable from the generating device has to be mechanically terminated somewhere (to the structure of the SUTU). Then, a lighter weight, more flexible cable (possibly in an oil filled hose) comes out of the SUTU and ends in a wet-mate connector portion for connection to the input connector of the base 6. This lighter jumper cable is manageable by an ROV or diver. An alternative configuration can have the lighter cable in oil-filled hose coming directly from a wet-mate connector on the engagement structure to become a flying lead that can be plugged into a mating half on the SUTU. The double ended version has a flexible oilfilled jumper with a wetmate both ends, a socket on the SUTU and a socket on the base.

Figure 10:
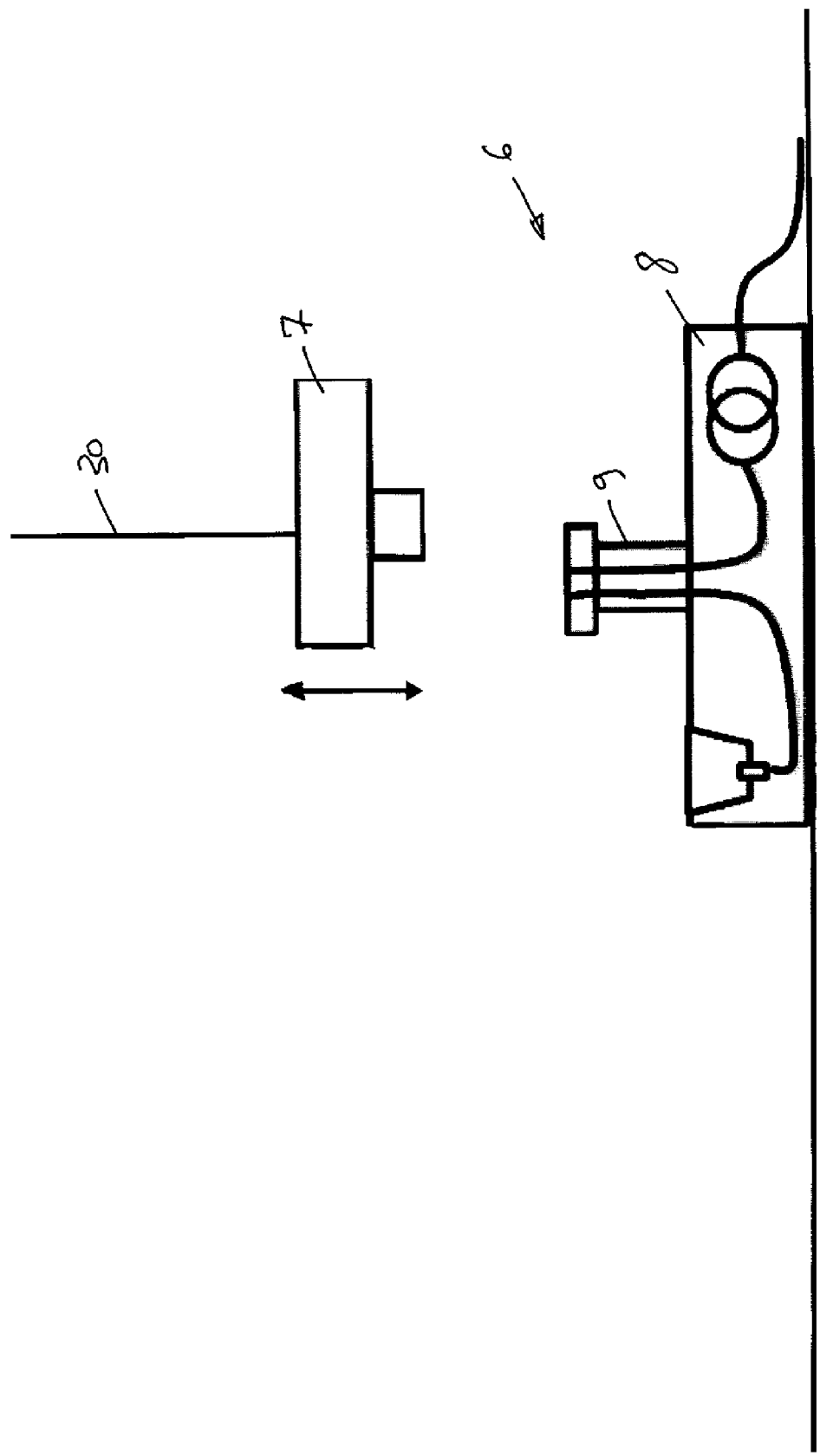
FIGS. 10 and 11 illustrate respective infrastructure module deployment techniques.
Figure 11:
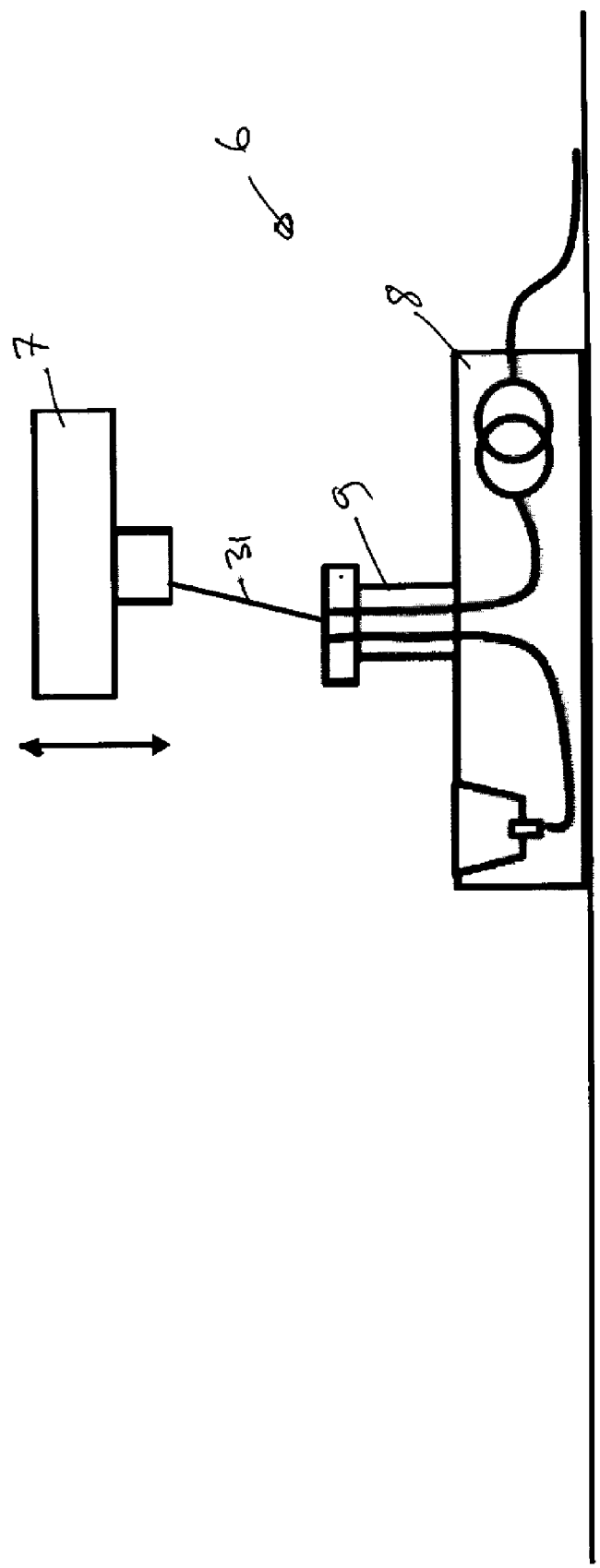

FIGS. 10 and 11 illustrate respective deployment and recovery techniques for the infrastructure module 7. FIG. 10 illustrates the technique for a "heavy" or non-buoyant module 7, in which a lift cable 30 is attached to the module 7 in order to raise the module from the engagement structure 9 on the base 8. When deploying a heavy infrastructure module 7, the lifting cable 30 is used to lower the module 7 into engagement with the engagement structure 9. This technique is also appropriate for deployment of a buoyant module to which weight is added (for example by flooding a chamber or chambers in the module) to enable the module to sink to the base for deployment.

FIG. 11 illustrates a deployment and recovery technique for a buoyant infrastructure module 7. In the FIG. 11 case, a winch tether 31 is used to connect the module 7 and the engagement structure 9. In order to locate the module 7 on the structure 9, a winch is used to wind in the tether 31, thereby pulling the module 7 down onto the support 6. When the module 7 needs recovering from the support 6, the winch tether 31 is paid out, and the buoyancy of the module 7 causes the module to float to the water surface for recovery. The winch may be fixed on the module 7, or may be removable from the module 7. As an alternative, the winch may be located on the base 6, and may be fixed or removable therefrom. A further alternative technique employs a winch mounted on the deck of the deployment vessel.

Figure 12:
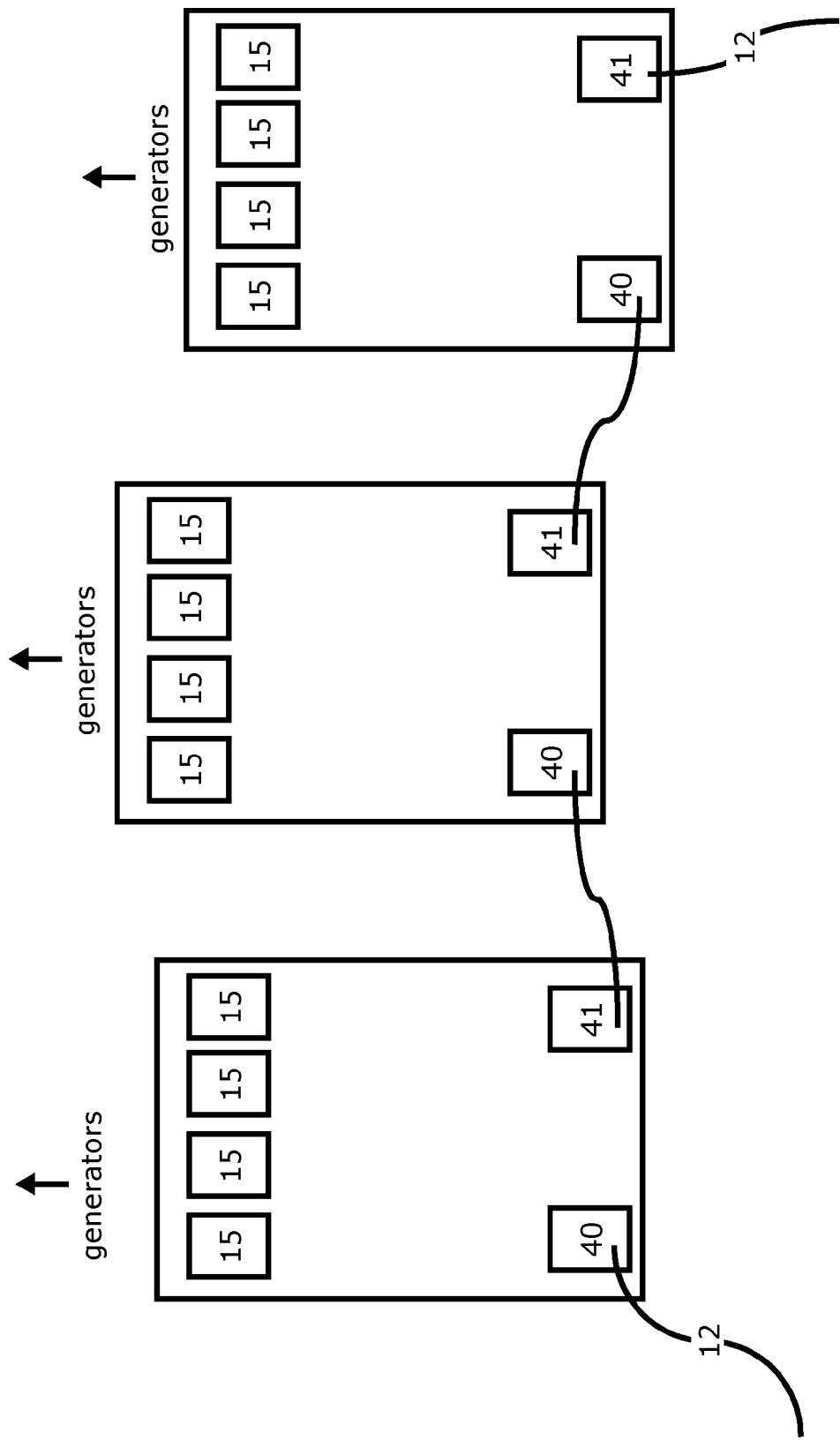
FIG. 12 illustrates a configuration of infrastructure arrangements.

FIG. 12 illustrates an example configuration of a plurality of infrastructure arrangements. The power generators are not shown for the sake of clarity. Each infrastructure arrangement has a number of connections 15 for connection with respective generators, as described above.

Each infrastructure arrangement in FIG. 12 has a pair of power transfer connections 40 and 41. The power transfer connections are connected within each infrastructure arrangement to one or both of the power transfer connections 40 and 41 using appropriate switch gear, isolators and/or transformers. The infrastructure arrangements are connected together in a series via the power transfer connections 40 and 41. One arrangement is connected for transfer of electrical power to one or more adjacent arrangements. Such a configuration enables power to be transferred between infrastructure arrangements, thereby reducing the number of power export cables emanating from the installation as a whole.

One or more of the infrastructure arrangements have the installation power export cable connected to one of the power transfer connections 40 and 41. In the example shown in FIG. 12, each arrangement located at the end of the series has an export cable. The provision of an appropriate or desired number of power export cables allows for flexibility in positioning and design of the overall array of power generators and infrastructure arrangements.

In one particular example, the power transfer connections are provided with isolators such that interconnections between arrangements can be switched on and off. Such a provision enables selected routing of power export from the installation. In another example, the bases of the infrastructure arrangements may be provided with by-pass apparatus to enable generators connected to a single infrastructure arrangement to be isolated from the export power cable, whilst enabling the interconnection of the remaining infrastructure arrangements to remain connected. In this way, groups of generators can be isolated from the power export, while remaining generators can continue to export power from the installation.

The power transfer connections 40 and 41 may be provided by any suitable connector arrangement, such as those described above featuring wet mate connectors or dry mate connectors.

In an example array, the generators connected with an infrastructure arrangement may be connected together in a series, in a manner similar to that described above for the infrastructure arrangements.

The invention claimed is:

1. An infrastructure arrangement for a water-based power generating installation, the installation including a power generating device operable to: (1) derive electrical power from a body of water, and (2) to export the electrical power via a power generating device export cable, the infrastructure arrangement being separate from the power generating installation and comprising:
   a base configured to be positioned on a bed of a body of water, the base comprising:
      a power transfer connection connected to the base and configured to transfer the electrical power from the infrastructure arrangement;
      a power input connection configured to receive the electrical power from the power generating device of the power generating installation via power generating device export cable, and
      an engagement system configured to receive an infrastructure module; and
   the infrastructure module releasably engaged with the engagement system of the base, the infrastructure module including an electrical connection apparatus configured to electrically connect the power input connection of the base to the power transfer connection of the base, wherein:

the power input connection of the base includes a connector portion that is configured to connect to a corresponding connector portion of the power generating device export cable, and the power input connection of the base defines a connector shape such that a connector module of the power generating device export cable is configured to be lowered onto the power input connection of the base to connect the power generating device export cable to the power input connection.

2. An arrangement as claimed in claim 1, wherein the connector portions are wet-mate connectors.

3. An arrangement as claimed in claim 1, further comprising a clamping apparatus for holding the infrastructure module in place on the engagement system.

4. An arrangement as claimed in claim 1, wherein the infrastructure module and base are provided with at least one cooperating wet-mate connector pair.

5. An arrangement as claimed in claim 1, wherein the infrastructure module is buoyant.

6. An arrangement as claimed in claim 1, wherein the infrastructure module is buoyant and is adapted to be deployed on the base using a winch arrangement.

7. An arrangement as claimed in claim 1, wherein the power transfer connection is adapted for connection with the power generating device export cable using a spliced, dry-mate or wet-mate connector.

8. An arrangement as claimed in claim 1, wherein the base is a gravity base unit.

9. An arrangement as claimed in claim 1, wherein the infrastructure module includes one or more switch, frequency converter, isolator, circuit breaker, signal booster, transformer, and/or measurement and control equipment.

10. An arrangement as claimed in claim 1, wherein the base further includes one or more switch, frequency converter, isolator, circuit breaker, signal booster, transformer, and/or measurement and control equipment.

11. An arrangement as claimed in claim 1, wherein the power generating device export cable includes a subsea umbilical termination unit configured to connect the power generating device export cable to the jumper cable, the jumper cable being configured to connect to the power input connection of the base.

12. An arrangement as claimed in claim 11, wherein:
the power generating device export cable includes a subsea umbilical termination unit for connecting the power generating device export cable from the power generating device to a jumper cable, the jumper cable being configured to connect to the power input connection of the base, and
the jumper cable comprises a wet-mate connector configured to connect to the subsea umbilical termination unit.

13. An arrangement as claimed in claim 11, wherein:
the jumper cable comprises a wet-mate connector configured to connect to the power input connection of the base.

14. An arrangement as claimed in claim 11, wherein:
the power generating device export cable includes a subsea umbilical termination unit for connecting the power generating device export cable from the power generating device to a jumper cable,
the jumper cable is configured to connect to the power input connection of the base, the jumper cable having a first end and a second end with respective wet-mate connector portions, and
the power input connection is provided by the jumper cable such that the first end of the jumper cable is configured to connect to the base, and the second end of the jumper cable is configured to connect to the subsea umbilical termination unit.

15. An arrangement as claimed in claim 1, wherein the power transfer connection and/or power export cable of the generating device comprises power and auxiliary connections.

16. An arrangement as claimed in claim 1, wherein:
the power transfer connection and/or power export cable of the generating device comprises power and auxiliary connections, and
the power and auxiliary connections are provided in separate respective cables.

17. An arrangement as claimed in claim 1, wherein:
the power transfer connection and/or power export cable of the generating device comprises power and auxiliary connections, and
the power and auxiliary connections are provided in a single cable.

18. An arrangement as claimed in claim 1, wherein:
the power transfer connection and/or power export cable of the generating device comprises power and auxiliary connections, and
the auxiliary connections provide measurement, control and/or communications connections.

19. An arrangement as claimed in claim 1, wherein:
the base comprises a plurality of power input connections configured to receive power from a plurality of power generating devices, and
the infrastructure module includes equipment configured to connect the plurality of input connections to the power transfer connection.

20. A water-based power generating installation comprising:
a water based power generating device operable to derive power from a body of water, and to export that power via a power generating device export cable; and
an infrastructure arrangement for providing a power transfer connection from the arrangement, the infrastructure arrangement including infrastructure equipment for the installation, the infrastructure equipment being configured to connect the power generating device to the power transfer connection,
wherein the infrastructure arrangement is provided by an arrangement as claimed in claim 1.

21. An installation as claimed in claim 20, wherein the power generating device is a water stream turbine device.

22. An installation as claimed in claim 20, wherein the power generating device is a tidal stream turbine device.

23. An installation as claimed in claim 20, wherein the power generating device is a wave powered device.

* * * * *